3,100,207
10-AMINOALKYLBENZO[b,f]THIEPIN AND -DIBENZ[b,f]OXEPIN DERIVATIVES
Charles L. Zirkle, Haddon Heights, N.J., assignor to Smith Kline & French Laboratories, Philadelphia, Pa., a corporation of Pennsylvania
No Drawing. Filed July 8, 1959, Ser. No. 825,670
11 Claims. (Cl. 260—268)

This invention relates to new 10-aminoalkyldibenzo[b,f]thiepin and -dibenz[b,f]oxepin derivatives which have useful pharmacodynamic activity. Further, this invention relates to novel 10-aminoalkyl-10-thiaxanthene methanol and 9-aminoalkyl-9-xanthene methanol intermediates.

More specifically the thiepin and oxepin compounds of this invention have utility as central nervous system stimulants, antihistaminics and antispasmodics. The new 10-aminoalkyl-10-thiaxanthene methanol and 9-aminoalkyl-9-xanthen methanol compounds have utility, especially as intermediates as will be evident from the following disclosure.

The novel 10-aminoalkyldibenzo[b,f]thiepin and -dibenz[b,f]oxepin derivatives of this invention are represented by the following structural formula:

(Formula I)

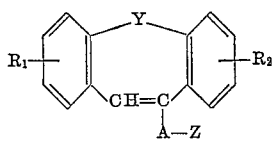

when:
Y represents sulfur or oxygen;
$R_1$ and $R_2$ represent hydrogen, halogen having an atomic weight of less than 80, trifluoromethyl, lower alkyl, preferably methyl, lower alkoxy, preferably methoxy, or lower alkylthio, preferably methylthio;
A represents a divalent, saturated, straight or branched alkylene chain having 2 to 4 carbon atoms, separating the amino and the thiepin or oxepin moiety to which it is attached by at least 2 carbon atoms; and
Z represents di-lower alkylamino, N-pyrrolidinyl, N-piperidyl, C-(N-lower alkyl)piperidyl, N-piperazinyl, N'-formyl-N-piperazinyl, N'-methyl-N-piperazinyl, N'-hydroxyethyl-N-piperazinyl, N'-acetoxyethyl-N-piperazinyl or N'-hydroxyethoxyethyl-N-piperazinyl.

Advantageous compounds of this invention are represented by the following structural formula:

(Formula II)

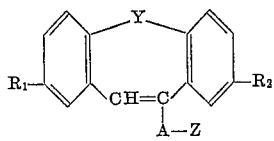

when:
Y represents sulfur or oxygen;
$R_1$ and $R_2$ represent hydrogen, chloro or trifluoromethyl;
A represents ethylene or proyplene; and
Z represents di-lower alkylamino, N'-methyl-N-piperazinyl, N'-hydroxyethyl-N-piperazinyl or N'-acetoxyethyl-N-piperazinyl.

The novel 10-aminoalkyl-10-thiaxanthene methanol and 9-aminoalkyl-9-xanthene methanol compounds useful as intermediates in the preparation of the pharmacodynamically active compounds of Formulas I and II and a part of this invention are represented by the following structural formula:

(Formula III)

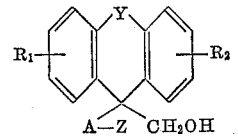

when:
Y represents sulfur or oxygen;
$R_1$ and $R_2$ represent hydrogen, halogen having an atomic weight of less than 80, trifluoromethyl, lower alkyl or lower alkoxy;
A represents a divalent, saturated, straight or branched alkylene chain having 2 to 4 carbon atoms, separating the amino and the thiaxanthene or xanthene moiety to which it is attached by at least 2 carbon atoms; and
Z represents di-lower alkylamino, N-pyrrolidinyl, N-piperidyl, C-(N-lower alkyl)piperidyl, N-piperazinyl, N'-formyl-N-piperazinyl, N'-methyl-N-piperazinyl, N'-hydroxyethyl-N-piperazinyl, N'-acetoxyethyl-N-piperazinyl or N'-hydroxyethoxyethyl-N-piperazinyl.

By the terms "lower alkyl" and "lower alkoxy" where used herein alone or in combination with other terms, groups having from 1 to 4, preferably 1, carbon atoms are indicated.

This invention also includes pharmaceutically acceptable, acid addition salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

The novel 10-aminoalkyl-10-thiaxanthene methanol and 9-aminoalkyl-9-xanthene methanol intermediates are prepared as shown in the following synthetic scheme:

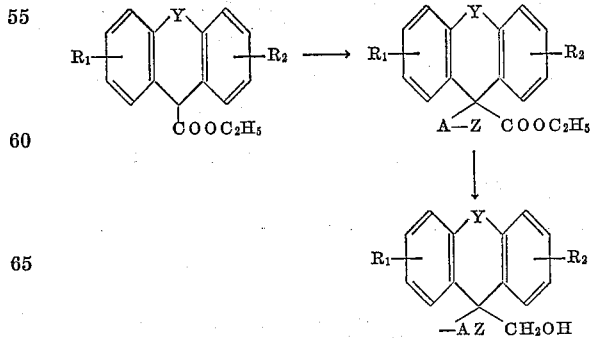

The terms Y, $R_1$, $R_2$, A and Z are as previously defined.
The starting materials for preparing these intermediates, namely 10-thiaxanthene- and 9-xanthenecarboxylic acid esters, are either known to the art or are prepared according to the following procedure:

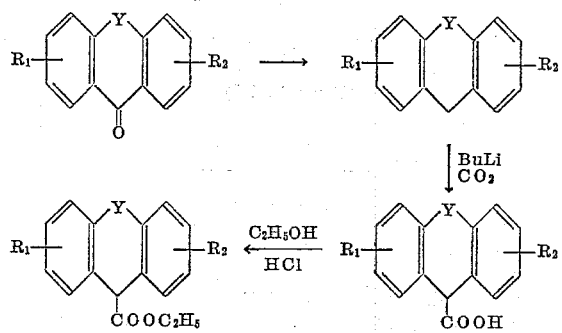

According to the above procedure, thiaxanthenones or xanthenones are reduced by catalytic hydrogenation or preferably, with sodium and an alcohol such as, for example, isobutyl or isoamyl alcohol. Treatment of the resulting thiaxanthene or xanthene with butyl lithium and carbon dioxide gives the 10-thiaxanthene- or 9-xanthenecarboxylic acid which is esterified with a lower alcohol such as ethanol in the presence of an acid catalyst such as hydrogen chloride.

The thiaxanthenones and xanthenones of the above process are either known to the art or may be prepared in a variety of ways such as:

(1) A thiosalicylic acid may be treated with benzene and concentrated sulfuric acid.

(2) Reaction of a sodium or potassium phenolate or thiophenolate with an o-chlorobenzoic acid and cyclization of the resulting o-aryloxy-(or thio)benzoic acid by heating, advantageously in the presence of an acidic reagent.

The 10-thiaxanthene- or 9-xanthene-carboxylic acid ester starting material in an inert organic solvent such as toluene or xylene is treated with an equal molar amount of potassium or sodium. To this mixture is added at least an equal molar amount, preferably an excess, of an aminoalkylhalide and the resulting solution is heated, conveniently at the reflux temperature of the solvent, for about 16 to 30 hours. Advantageously the reaction mixture is worked up by washing with a lower alcohol such as ethanol, extracting the organic solution with dilute hydrochloric acid, neutralizing the aqueous solution, extracting with an organic solvent such as chloroform or ether evaporating the organic solvent and distilling the 10-aminoalkyl-10-thiaxanthene- or 9-aminoalkyl-9-xanthene-carboxylic acid ester. Certain piperazinylalkyl derivatives are prepared by further N-alkylation to form the various N-substituted piperazinyl compounds. The 10-aminoalkyl - 10 - thiaxanthene or 9-aminoalkyl-9-xanthene carboxylic acid ester is reduced to the novel intermediate, 10-aminoalkyl - 10 - thiaxanthene or 9-aminoalkyl-9-xanthene methanol by treatment with a bimetallic hydride reducing agent such as, for example, lithium aluminum hydride or sodium aluminum hydride. The reaction is advantageously carried out by refluxing in ether solution for about 4 to 8 hours.

The 10-aminoalkyldibenzo[b,f]thiepin and -dibenz[b,f]oxepin derivaives of this invention are prepared from the novel thiaxanthene and xanthene methanol intermediates according to the following procedure:

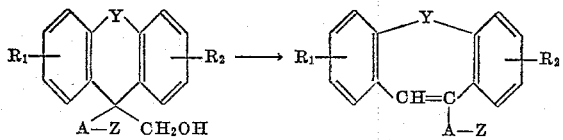

The terms Y, $R_1$, $R_2$, A and Z are as previously defined.

The thiaxanthene or xanthene methanol intermediate is treated with a dehydrating agent such as thionyl chloride, polyphosphoric acid or, preferably, phosphorus pentoxide in an organic solvent in which the reactants are substantially soluble and with which they are unreactive such as the preferred aromatic solvents, for example xylene, toluene or benzene. The reaction mixture is heated advantageously at temperatures of from about 50° C. to about 150° C., preferably at the reflux temperature of the reaction mixture until the reaction is substantially complete usually for about three to about seven hours. Conditions beyond those described here can be used however with no appreciable advantage.

Conveniently the reaction mixture is worked up by adding water, then alkali metal hydroxide solution, such as sodium or potassium hydroxide, until the solution is basic, separating the organic layer, evaporating the solvent and distilling the 10-aminoalkyldibenzo[b,f]thiepin and -dibenzo[b,f]oxepin compounds of this invention. In the formation of unsymmetrical dibenzo[b,f]thiepins and oxepins, a mixture of position isomers is usually obtained. These isomers are conveniently separated by fractional crystallization of their salts, such as the hydrochloride or citrate salts.

It will be readily apparent to one skilled in the art that certain of the compounds of this invention, notably those in which A is represented by an aliphatic carbon chain branched so that an asymmetric carbon atom is formed, may be present as optical isomers. The connotation of the general formulae presented herein is to include all isomers, the separated $d$ or $l$ optical isomers as well as the $dl$ mixture of these isomers.

The 10-aminoalkyldibenzo[b,f]thiepins and particularly the 10-aminoalkyldibenz[b,f]oxepins of this invention are also useful as intermediates in the preparation of the corresponding 10,11-dihydro compounds by the following procedure:

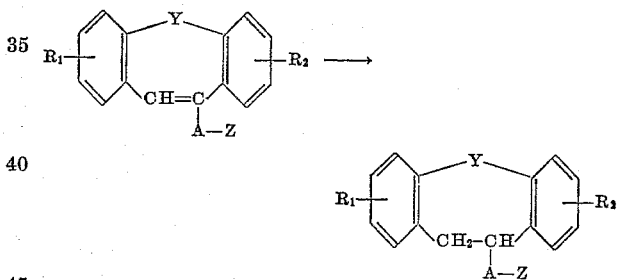

The terms Y, $R_1$, $R_2$, A and Z are as previously defined.

The thiepin and oxepin compounds of this invention are hydrogenated in the presence of a hydrogenation catalyst such as, for example Raney nickel or a noble metal catalyst, such as platinum oxide or palladium-on-charcoal to obtain the corresponding 10-aminoalkyl-10,11-dihydrodibenzo[b,f]thiepins and -dibenz[b,f]oxepins.

The following examples are not limiting but are illustrative of compounds of this invention and the procedures for their preparation and will serve to make fully apparent all of the compounds embraced by the general formula given above.

*Example 1*

Potassium (16.0 g.) is added slowly to a solution of 110.0 g. of ethyl 10-thiaxanthene carboxylate in 1700 ml. of dry toluene. The resulting mixture is stirred for two hours, then slowly heated to reflux. To the cooled mixture is added 59.5 g. of 3-chloro-1-dimethylaminopropane in 200 ml. of toluene. The mixture is refluxed for 24 hours and treated with 100 ml. of ethanol. The toluene layer is extracted with dilute hydrochloric acid, the acid extracts are neutralized with sodium carbonate and extracted with chloroform. The chloroform extracts are dried, evaporated and distilled to give ethyl 10-(3'-dimethyaminopropyl) - 10 - thiaxanthenecarboxylate, B.P. 194–198° C. (0.1–0.2 mm.).

A solution of 97.1 g. of the above prepared carboxylate in 250 ml. of ether is added slowly to 7.8 g. of lithium aluminum hydride in 600 ml. of dry ether. The resulting mixture is refluxed for 6.5 hours, then treated with ethyl acetate-ether and 17.6 ml. of water. This mixture is stirred for three hours at room temperature and filtered. The filtrate is dried over anhydrous potassium carbonate, concentrated and treated with an excess of maleic acid. Filtration of the solid material and recrystallization from ethanol-ether gives 10-(3'-dimethylaminopropyl)-10-thiaxanthene methanol maleate, M.P. 143.5–145° C.

An ethanol solution of the above prepared salt is neutralized with sodium hydroxide solution, extracted with ether and the ether extract evaporated to give, as the residue, the free base.

A mixture of 31.9 g. of 10-(3'-dimethylaminopropyl)-10-thiaxanthene methanol, 150 g. of phosphorus pentoxide and 1200 ml. of dry xylene is stirred and refluxed for three hours. Cooling, adding water, making the solution basic by adding 40% sodium hydroxide, drying the xylene solution over potassium carbonate, evaporating and distilling gives 10-(3'-dimethylaminopropyl)-dibenzo[b,f]thiepin, B.P. 172–177° C. (.22 mm.).

*Example 2*

To a solution of 70.0 g. of ethyl 10-thiaxanthenecarboxylate in 1200 ml. of dry toluene is added 10.0 g. of potassium. The mixture is stirred at room temperature for two hours, then refluxed for 15 minutes. 2-chloro-1-dimethylaminoethane (89.5 g.) is added and the resulting mixture is refluxed for 24 hours, then treated with 200 ml. of t-butanol and stirred for one hour. Ethanol (50 ml.) is added. The toluene layer is extracted with dilute hydrochloric acid; the aqueous layer is made basic and extracted with chloroform. Evaporation and distillation of the chloroform extracts gives ethyl 10-(2'-dimethylaminoethyl) - 10 - thiaxanthenecarboxylate, B.P. 182–189° C. (.1–.12 mm.).

A solution of 110.0 g. of this carboxylate in 300 ml. of ether is added slowly to 9.26 g. of lithium aluminum hydride in 700 ml. of ether and the resulting mixture is refluxed for 6.5 hours. Working up as in Example 1 gives 10-(2'-dimethylaminoethyl)-10-thiaxanthene methanol.

A mixture of 45.0 g. of 10-(2'-dimethylaminoethyl)-10-thiaxanthene methanol, 200 g. of phosphorus pentoxide and 1600 ml. of dry xylene is refluxed for 3.5 hours with stirring. Working up as in Example 1 gives 10 - (2' - dimethylaminoethyl)dibenzo[b.f]thiepin, B.P. 168–173° C. (.055 mm.).

The free base (1.0 g.) is dissolved in 50 ml. of ether and treated with an excess of alcoholic hydrogen chloride. Dilution with ether and filtration yields 10-(2' - dimethylaminoethyl)dibenzo[b,f]thiepin hydrochloride which is recrystallized from ethanol-ether, M.P. 215–216° C.

*Example 3*

A mixture of 188 g. of 5-chloro-2-mercaptobenzoic acid, 600 ml. of dry benzene and 1800 ml. of concentrated sulfuric acid is refluxed for five minutes, then stirred at room temperature for 24 hours. The mixture is poured into ice and the precipitate which forms is filtered, washed with water, with dilute ammonium hydroxide and with ethanol to give 2-chloro-10-thiaxanthenone.

The above prepared 2-chloro-10-thiaxanthenone (75.0 g.) is dissolved in 1500 ml. of refluxing isoamyl alcohol. Sodium (50.0 g.) is added slowly and the resulting mixture is refluxed for 30 minutes. The excess alcohol is steam distilled and the residue is cooled, treated with cold water and filtered to give crystalline 2-chloro-thiaxanthene.

Butyl bromide (80.0 g.) in 150 ml. of ether is added to 10.0 g. of lithium in 600 ml. of ether at −10° C. and the mixture is slowly warmed to +5° C. Fifty grams of 2-chlorothiaxanthene is added and the resulting mixture is refluxed for one hour, then cooled in Dry Ice and added, under nitrogen, to 1500 ml. of ether saturated with carbon dioxide in a Dry Ice-alcohol bath (−50° C.). The mixture is stirred in the Dry Ice bath for two hours, then filtered. The filtrate is treated with ethanol, then water and filtered. The aqueous layer is acidified and filtered to give 2-chloro-10-thiaxanthenecarboxylic acid as a white solid. This carboxylic acid is esterified by refluxing in excess ethanol containing hydrogen chloride, then concentrating the solution, adding ether, washing with water and sodium bicarbonate solution and distilling to give ethyl 2-chloro-10-thiaxanthenecarboxylate.

The above prepared carboxylate in toluene solution is treated with potassium and then with an excess of 3-chloro-1-dimethylaminopropane. Refluxing the mixture for 24 hours and working up as in Example 1 gives 2-chloro-10 - (3' - dimethylaminopropyl) - 10-thiaxanthenecarboxylate.

Reduction of ethyl 2-chloro-10-(3'-dimethylaminopropyl)-10-thiaxanthenecarboxylate with lithium aluminum hydride in ether solution as in Example 1 gives 2-chloro - 10 - (3' - dimethylaminopropyl) - 10-thiaxanthene methanol.

A mixture of 25 g. of the above prepared methanol derivative, 100 g. of phosphorus pentoxide and 750 ml. of dry xylene is refluxed for three hours. Working up as in Example 1 gives a mixture of 2-chloro-10-(3'-dimethylaminopropyl)dibenzo[b,f]thiepin and 2-chloro-11-(3'-dimethylaminopropyl)dibenzo[b,f]thiepin. This mixture of isomers is dissolved in ether and treated with an excess of alcoholic hydrogen chloride. Dilution with ether and filtration gives a mixture of the hydrochloride salts. Separating the isomers by fractional crystallization from ethanol-ether gives 2-chloro-10-(3'-dimethylaminopropyl)dibenzo[b,f]thiepin hydrochloride and 2-chloro-11-(3'-dimethylaminopropyl)dibenzo[b,f]thiepin hydrochloride. Dissolving the hydrochloride salts in ethanol, neutralizing with sodium carbonate, extracting with ether and evaporating the ether extracts gives the free bases, 2-chloro-10-(3'-dimethylaminopropyl)dibenzo[b,f]thiepin and 2-chloro-11-(3'-dimethylaminopropyl)dibenzo[b,f]thiepin.

*Example 4*

To a mixture of 24.2 g. of 2-methoxy-10-thiaxanthenone in 500 ml. of refluxing isoamyl alcohol is slowly added 10.0 g. of sodium in small pieces. The resulting mixture is refluxed for 30 minutes. The alcohol is steam distilled; the residue is cooled, diluted with cold water and filtered. The solid product is triturated with petroleum ether to give 2-methoxythiaxanthene.

To 5.0 g. of lithium in 300 ml. of dry ether is added 40.0 g. of butyl bromide in 60 ml. of ether at −10° C. The mixture is slowly warmed to +6° C., then treated with 25.0 g. of 2-methoxythiaxanthene and refluxed for one hour. After cooling in Dry Ice, the mixture is added (under nitrogen) to 600 ml. of dry ether saturated with carbon dioxide in Dry Ice-alcohol bath at less than −50° C. The mixture is stirred in the Dry Ice bath for two hours, filtered, diluted with 35 ml. of ethanol, allowed to stand for three hours, treated with water and filtered. The aqueous layer is acidified and filtered to give 2-methoxy-10-thiaxanthene carboxylic acid as a white solid.

The above prepared carboxylic acid is esterified by refluxing for one hour in 250 ml. of ethyl alcohol containing hydrogen chloride. Concentrating the solution, diluting with ether, washing with water and sodium bicarbonate solution, concentrating and distilling yields ethyl 2-methoxy-10-thiaxanthenecarboxylate.

A solution of 30.0 g. of the above prepared carboxylate in 600 ml. of dry xylene is treated with 3.9 g. of potassium. After stirring for two hours, heating to reflux and cooling, 25.0 g. of 3-chloro-1-dimethylaminopropane is added. Refluxing for 24 hours and working up as in Example 1 gives ethyl 2-methoxy-10-(3'-dimethylaminopropyl)-10-thiaxanthenecarboxylate.

Reduction of the above prepared carboxylate by refluxing in ether solution with lithium aluminum hydride yields 2 - methoxy - 10 - (3' - dimethylaminopropyl)-10-thiaxanthene methanol.

A mixture of 30.0 g. of 10-(3'-dimethylaminopropyl)-10-thiaxanthene methanol, 150 g. of phosphorus pentoxide and 1200 ml. of dry xylene is stirred and refluxed for three hours. After cooling, water is added, then the aqueous solution is made basic by the addition of 40% sodium hydroxide. The xylene layer is separated, dried, evaporated and distilled to give a mixture of 2-methoxy-10-(3'-dimethylaminopropyl)dibenzo[b,f]thiepin and 2-methoxy - 11 - (3' - dimethylaminopropyl)dibenzo[b,f]thiepin. These isomers are dissolved in acetone and treated with a molar equivalent of citric acid in acetone. Concentrating, cooling and filtering yields a mixture of the citrate salts. Fractional crystallization from ethanol-ether gives 2-methoxy-10-(3'-dimethylaminopropyl)dibenzo[b,f]thiepin citrate and 2-methoxy-11-(3'-dimethylaminopropyl)dibenzo[b,f]thiepin citrate.

The free base is obtained by dissolving the citrate salt in ethanol, neutralizing with sodium carbonate, extracting with ether and evaporating the ether extracts.

*Example 5*

A solution of 50.8 g. of ethyl 9-xanthenecarboxylate in 500 ml. of dry toluene is treated with 7.8 g. of potassium. The resulting mixture is stirred at room temperature for two hours, then refluxed for ten minutes. To this mixture is added 36.3 g. of 3-chloro-1-dimethylaminopropane and the resulting solution is refluxed for 24 hours. Ethanol (200 ml.) is added to the cooled mixture. The toluene layer is extracted with dilute hydrochloric acid. The aqueous extracts are made basic and extracted with chloroform. The chloroform extracts are evaporated and distilled to give ethyl 9-(3'-dimethylaminopropyl)-9-xanthenecarboxylate.

An ether solution of the above prepared carboxylate (33.9 g. in 150 ml. of ether) is added slowly to 3.0 g. of lithium aluminum hydride in 100 ml. of ether. The mixture is refluxed for seven hours and worked up as in Example 1 to give 9-(3'-dimethylaminopropyl)-9-xanthene methanol.

A mixture of 29.7 g. of the above prepared methanol, 150 g. of phosphorus pentoxide and 1500 ml. of dry xylene is refluxed with stirring for three hours. The mixture is cooled, treated with water, then 40% sodium hydroxide until the aqueous layer is basic. The organic layer is separated, dried, concentrated and distilled to give 10-(3'-dimethylaminopropyl)dibenz[b,f]oxepine.

A solution of the free base (1.0 g. in 50 ml. of ethyl acetate) is treated with an equivalent amount of maleic acid. Concentration and cooling gives the maleate salt.

*Example 6*

Potassium (7.8 g.) is added to a solution of 50.8 g. of ethyl 9-xanthenecarboxylate in 500 ml. of dry toluene. The resulting mixture is stirred for two hours at room temperature, then heated to reflux. To this mixture is added 53.2 g. of N-(2'-chloroethyl)pyrrolidine. Refluxing for 30 hours then working up the reaction mixture as in Example 5 gives ethyl 9-(2'-N-pyrrolidinylethyl)-9-xanthenecarboxylate.

A mixture of 35.1 g. of the above prepared carboxylate, 3.0 g. of lithium aluminum hydride and 300 ml. of ether is refluxed for eight hours. Dilution with ethyl acetate-ether, followed by dilution with water, filtration and evaporation of the solution gives as the residue, crude 9-(2'-N-pyrrolidinylethyl)-9-xanthene methanol.

An ether solution of 9-(2'-N-pyrrolidinylethyl)-9-xanthene methanol is treated with an excess of alcoholic hydrogen chloride. Dilution with ether, filtration and recrystallization gives 9-(2'-N-pyrrolidinylethyl)-9-xanthene methanol hydrochloride.

A mixture of 31.1 g. of 9-(2'-N-pyrrolidinylethyl)-9-xanthene methanol, 150 g. of phosphorus pentoxide and 1200 ml. of dry xylene is refluxed for 3.5 hours. Cooling, washing with water and with dilute sodium hydroxide solution, drying, concentrating and distilling gives 9-(2'-N-pyrrolidinylethyl)dibenz[b,f]oxepine.

An ethyl acetate solution of the free base is treated with an equivalent amount of citric acid to give, upon concentration and cooling, the citrate salt.

*Example 7*

To a solution of 54.0 g. of ethyl 10-thiaxanthenecarboxylate in one liter of dry toluene is added 7.8 g. of potassium. The resulting mixture is stirred for two hours at room temperature, then refluxed for ten minutes. A solution of 70.4 g. of 1-(3'-chloropropyl)-4-methylpiperazine in 200 ml. of toluene is added and the mixture is refluxed for 20 hours. Working up the reaction mixture as in Example 5 gives ethyl 10-[2'-(4''-methyl-1''-piperazinyl)propyl]-10-thiaxanthenecarboxylate.

A solution of 40.9 g. of the above prepared carboxylate in 200 ml. of ether is added slowly to 3.5 g. of lithium aluminum hydride in 200 ml. of dry ether. Refluxing for seven hours, treatment with ether-ethyl acetate, followed by water, filtration and concentration of the solution gives, as the residue, 10-[3'-(4''-methyl-1''-piperazinyl)propyl]-10-thiaxanthene methanol.

The above prepared methanol (36.8 g.) is refluxed for three hours in one liter of dry xylene containing 150 g. of phosphorus pentoxide. Working up as in Example 6 gives 10 - [3'-(4''-methyl-1''-piperazinyl)propyl]dibenzo[b,f]thiepin.

Treatment of the free base in ether solution with an excess of alcoholic hydrogen chloride gives the hydrochloride salt.

*Example 8*

A solution of 54.0 g. of ethyl 10-thiaxanthenecarboxylate in 1200 ml. of dry toluene is treated with 7.8 g. of potassium. After stirring for two hours, heating to reflux and cooling, 70.0 g. of 1-formyl-4-(3'-chloropropyl)-piperazine is added. The resulting mixture is refluxed for 24 hours, washed with ethanol and extracted with dilute hydrochloric acid. The acidic extracts are made basic with sodium carbonate solution and extracted with chloroform. The chloroform extracts are concentrated and distilled to give ethyl 10-[3'-(4''-formyl-1''-piperazinyl)-propyl]-10-thiaxanthenecarboxylate.

The above prepared carboxylate is reduced with lithium aluminum hydride in ether solution and worked up as in Example 7 to give 10-[3'-(4''-formyl-1''-piperazinyl)propyl]-10-thiaxanthene methanol. This methanol derivative (38.0 g.) is refluxed with 150 g. of phosphorus pentoxide in 1000 ml. of dry xylene for three hours. Working up the reaction mixture by washing with water, with dilute sodium carbonate solution, drying, concentrating and distilling gives 10-[3'-(4''-formyl-1''-piperazinyl)propyl]dibenzo[b,f]thiepin.

*Example 9*

A mixture of 15.0 g. of 10-[3'-(4''-formyl-1''-piperazinyl)propyl]dibenzo[b,f]thiepin made as in Example 8, in 150 ml. of ethanol and 100 ml. of water containing 5 ml. of 40% sodium hydroxide solution is refluxed for 15 minutes. The ethanol is removed by distillation in vacuo and the residue is treated with benzene and water. The benzene layer is separated, dried and evaporated in vacuo to give, as the residue 10-(3'-N-piperazinylpropyl)-dibenzo[b,f]thiepin.

*Example 10*

Ethylene oxide (.88 g.) is added to a mixture of 6.76 g. of 10 - (3' - N - piperazinylpropyl)dibenzo[b,f]thiepin, made as in Example 9, in 50 ml. of methanol and the mixture heated at reflux for two hours. The solvent is removed in vacuo to give crude 10-[3'-(4''-hydroxyethyl-1''-piperazinyl)propyl]dibenzo[b,f]thiepin.

Example 11

A mixture of 3.8 g. of 10-[3'-(4''-hydroxyethyl-1''-piperazinyl)propyl]dibenzo[b,f]thiepin, made as in Example 10, and 20 ml. of benzene is treated with a solution of 1.0 g. of acetyl chloride in 15 ml. of benzene. The resulting mixture is refluxed for 30 minutes, cooled and concentrated in vacuo to give, as the residue, crude 10-[3'-(4''-acetoxyethyl - 1'' - piperazinyl)propyl]dibenzo[b,f]thiepin hydrochloride.

Example 12

A mixture of 3.38 g. of 10-(3'-N-piperazinylpropyl)-dibenzo[b,f]thiepin, 1.8 g. of 2-bromo-2'-hydroxyethyl ether and 3.0 g. of potassium carbonate in 75 ml. of toluene is refluxed for eight hours. The reaction mixture is poured into water. The organic layer is separated and extracted with dilute hydrochloric acid. The acidic extracts are made basic and extracted with benzene. Evaporation of the benzene yields crude 10-[3'-(4''-hydroxyethoxyethylpiperazinyl)propyl]dibenzo[b,f]thiepin.

Example 13

Potassium (4.0 g.) is added to a solution of 27.5 g. of ethyl 10-thiaxanthene carboxylate in 400 ml. of dry toluene and the mixture is stirred for 90 minutes at room temperature, then refluxed for ten minutes. Twenty grams of 1-chloro-3-dimethylamino-2-methyl propane is added and the mixture is refluxed for 24 hours. Ethanol is added; the toluene layer is separated and extracted with dilute hydrochloric acid. The acid extracts are made basic with sodium carbonate and extracted with chloroform. Evaporation of the chloroform from the extracts and distillation of the residue gives ethyl 10-(3'-dimethylamino-2'-methylpropyl)-10-thiaxanthenecarboxylate.

A solution of 37.0 g. of the above prepared carboxylate in 100 ml. of ether is added to 3.0 g. of lithium aluminum hydride in 300 ml. of ether. The mixture is refluxed for six hours and worked up as in Example 7 to give 10-(3'-dimethylamino-2'-methylpropyl)-10-thiaxanthene methanol. This methanol derivative (32.0 g.) is refluxed with 150 ml. of phosphorus pentoxide and one liter of dry toluene for 4.5 hours. Washing with water and with dilute sodium hydroxide solution, evaporating and distilling yields 10 - (3'- dimethylamino-2'-methylpropyl) - dibenzo [b,f]thiepin.

A solution of 1.0 g. of the free base in 50 ml. of ether is treated with an excess of alcoholic hydrogen bromide to yield the crude hydrobromide salt.

Example 14

A solution of 33.2 g. of ethyl salicylate in 200 ml. of aqueous ethanol containing 8.0 g. of sodium hydroxide is treated with 45.0 g. of 1-chloro-2-nitro-4-trifluoromethylbenzene. The resulting mixture is refluxed for 30 minutes, diluted with water and acidified with dilute hydrochloric acid. Filtration of the precipitate gives o-(2'-nitro-4'-trifluoromethylphenoxy)benzoic acid.

The above prepared nitro compound is added to a solution of 150 g. of stannous chloride dihydrate in 150 ml. of concentrated hydrochloric acid. The mixture is warmed on the steam bath at 85–90° C. for three hours, then poured into a cold solution of 200 g. of sodium hydroxide in 400 ml. of water. The precipitated product, o-(2'-amino-4'-trifluoromethylphenoxy)benzoic acid, is filtered off and washed with water.

A solution of 29.7 g. of o-(2'-amino-4'-trifluoromethylphenoxy)benzoic acid, 50 ml. of hydrochloric acid and 60 ml. of water is cooled to 10° C. and diazotized by the addition of 7.5 g. of sodium nitrite at 10° C. Cold 50% aqueous hypophosphorous acid (70.0 g.) is added and the reaction mixture is kept at 0°–5° C. for 24 hours. Addition of 40% sodium hydroxide until the mixture is basic and filtration of the precipitate gives o-(4'-trifluoromethylphenoxy)benzoic acid. Heating this compound for 20 minutes with 20 ml. of concentrated sulfuric acid on the steam bath, cooling, pouring into water and collecting the precipitate gives 2-trifluoromethyl-9-xanthenone.

Reduction of this xanthenone by refluxing with isoamyl alcohol and sodium yields the corresponding xanthene, which is added to an ether solution of butyl lithium and refluxed for one hour. The mixture is cooled in Dry Ice and added, under nitrogen, to ether saturated with carbon dioxide at −50° C. Working up as in Example 3 gives 2-trifluoromethyl-9-xanthene carboxylic acid. Esterifying, by refluxing in excess ethanol containing hydrogen chloride, and condensing with 3-chloro-1-dimethylaminopropane by refluxing in toluene solution gives ethyl 2-trifluoromethyl - 9 - (3'- dimethylaminopropyl)-9-xanthenecarboxylate.

An ether solution of 20.3 g. of the above prepared carboxylate is added slowly to 2.0 g. of lithium aluminum hydride in 100 ml. of dry ether. The mixture is refluxed for 6.5 hours, then treated with ethyl acetate-ether, heated to reflux, diluted with water, filtered and evaporated to give 2-trifluoromethyl-9-(3'-dimethylaminopropyl)-9-xanthene methanol.

A mixture of 15.0 g. of the above prepared methanol compound, 60.0 g. of phosphorus pentoxide and 400 ml. of dry xylene is refluxed for 3.5 hours. Cooling, adding water, then adding 40% sodium hydroxide until the aqueous layer is basic, separating the xylene layer, drying it over potassium carbonate, evaporating the xylene and distilling the residue gives a mixture of 2-trifluoromethyl-10-(3'-dimethylaminopropyl)dibenz[b,f]oxepin and 2-trifluoromethyl - 11 - (3'- dimethylaminopropyl)dibenz[b,f] oxepin. These isomers are separated by preparing the citrate salts and fractionally crystallizing them from ethanol-ether as in Example 4.

Example 15

Twenty grams of 2-trifluoromethyl-10-thiaxanthenone (prepared by condensation of thiosalicylic acid with 1-chloro-2-nitro-4-trifluoromethylbenzene in aqueous ethanol, reduction of the nitro group with stannous chloride and hydrochloric acid, removal of the amino group by diazotization and treatment with hypophosphorous acid and cyclization by refluxing the o-(4'-trifluoromethylphenylmercapto)benzoic acid with sulfuric acid as described in Example 14) in 200 ml. of refluxing isobutyl alcohol is treated with 10.0 g. of sodium. The resulting mixture is refluxed for 30 minutes. The excess alcohol is steam distilled. The residue is cooled, diluted with cold water and filtered. The solid product is 2-trifluoromethylthiaxanthene.

Butyl bromide (40.0 g.) in 50 ml. of ether is added to 5.0 g. of lithium in 300 ml. of ether slowly at −10° C. The mixture is gradually warmed to +6° C. Twenty grams of 2-trifluoromethylthiaxanthene is added and the mixture is refluxed for one hour, then cooled in Dry Ice and added, under nitrogen, to 500 ml. of ether saturated with carbon dioxide at −50° C. After stirring for two hours, filtering, adding ethanol and water, filtering, acidifying the aqueous layer and filtering the solid product gives 2-trifluoromethyl-10-thiaxanthene carboxylic acid. The corresponding ethyl carboxylate is prepared by refluxing this carboxylic acid in excess ethanol containing hydrogen chloride, then concentrating the solution, adding ether, washing with water and sodium bicarbonate solution and distilling.

To a solution of 11.0 g. of ethyl 2-trifluoromethyl-10-thiaxanthenecarboxylate in 170 ml. of dry toluene is added 1.6 g. of potassium and the mixture is stirred at room temperature for two hours, then heated to reflux. After cooling, 6.0 g. of 3-chloro-1-dimethylaminopropane in 25 ml. of toluene is added. The mixture is refluxed for 24 hours and worked up as in Example 1 to give ethyl 2-trifluoromethyl-10-(3'- dimethylaminopropyl)-10-thiaxanthenecarboxylate.

An ether solution of the above prepared carboxylate is added slowly to 1.0 g. of lithium aluminum hydride in 50 ml. of dry ether. The mixture is refluxed for six hours and worked up as in Example 14 to give 2-trifluoromethyl-10-(3'-dimethylaminopropyl)-10-thiaxanthene methanol.

Refluxing 10.0 g. of 2-trifluoromethyl-10-(3'-dimethylaminopropyl)-10-thiaxanthene methanol with 50.0 g. of phosphorus pentoxide and 300 ml. of dry toluene for four hours and working up as in Example 14 gives a mixture of 2-trifluoromethyl-10-(3'-dimethylaminopropyl)dibenzo[b,f]thiepin and 2-trifluoromethyl-11-(3'-dimethylaminopropyl)dibenzo[b,f]thiepin.

These isomers in ether solution are treated with an excess of ethanolic hydrogen chloride. The mixture is diluted with ether and the hydrochloride salts are isolated by filtration. Fractional crystallization from ethanol-ether separates the 2-trifluoromethyl-10-(3'-dimethylaminopropyl)dibenzo[b,f]thiepin and 11-(3'-dimethylaminopropyl)dibenzo[b,f]thiepin hydrochloride salts.

The free bases are obtained by dissolving the hydrochlorides in ethanol, neutralizing the solution with sodium carbonate, extracting with ether and evaporating the ether extracts to give the free base as the residue.

*Example 16*

Ten grams of lithium in 600 ml. of dry ether is treated with 80.0 g. of butyl bromide in 125 ml. of ether at −10° C. The mixture is warmed to +6° C. over two hours. Fifty grams of 3-methylxanthene is added and the resulting mixture is refluxed for one hour, then cooled in Dry Ice and added, under nitrogen, to one liter of dry ether saturated with carbon dioxide at −50° C. Working up as in Example 15 and esterifying by refluxing with ethanol containing hydrogen chloride gives ethyl 3-methyl-9-xanthenecarboxylate.

The above prepared carboxylate in toluene solution is condensed with 2-chloro-1-diethylaminoethane by refluxing for 24 hours and worked up as described in Example 2 to give ethyl 3-methyl-9-(2'-diethylaminoethyl)-9-xanthenecarboxylate.

A solution of 20.0 g. of this carboxylate in 200 ml. of ether is added to 1.5 g. of lithium aluminum hydride in 50 ml. of dry ether. The mixture is refluxed for 6.5 hours, then treated with ethyl acetate-ether, heated to reflux, diluted with water and filtered. The filtrate is concentrated and treated with an excess of alcoholic hydrogen chloride. Dilution with ether and filtration of the precipitate gives 3-methyl-9-(2'-diethylaminoethyl)-9-xanthene methanol hydrochloride.

A mixture of 15.0 g. of 3-methyl-9-(2'-diethylaminoethyl)-9-xanthene methanol (prepared by neutralizing an ethanol solution of the hydrochloride salt, extracting with ether and evaporating the ether extract), 80 g. of phosphorus pentoxide and 500 ml. of dry xylene is refluxed with stirring for four hours. Working up as in Example 14 gives a mixture of 3-methyl-10-(2'-diethylaminoethyl)dibenz[b,f]oxepin and 3-methyl-11-(2'-diethylaminoethyl)dibenz[b,f]oxepin.

The isomers are separated by dissolving in acetone, treating with a molar equivalent of citric acid in acetone, concentrating, cooling and filtering to give a mixture of the citrate salts, and crystallizing fractionally from ethanol-ether.

*Example 17*

2-chloro-8-methyl-10-thiaxanthenone is reduced by refluxing with isoamyl alcohol and sodium to give 2-chloro-8-methyl-10-thiaxanthene which is treated with butyl lithium in ether solution and subsequently with a cold ether solution saturated with carbon dioxide to yield 2-chloro-8-methyl-10-thiaxanthene carboxylic acid.

To a solution of 31.8 g. of ethyl 2-chloro-8-methyl-10-thiaxanthenecarboxylate (prepared by refluxing the carboxylic acid in ethanol containing hydrogen chloride, concentrating, adding ether, washing with water and sodium carbonate and distilling the ethyl ester) in 300 ml. of dry toluene is added 3.9 g. of potassium. The resulting mixture is stirred for two hours at room temperature, then refluxed for ten minutes. 3-chloro-1-dimethylaminopropane (25.0 g.) is added slowly. After refluxing for 24 hours, ethanol is added. The toluene layer is extracted with ether. Evaporation and distillation of the ether extracts give ethyl 2-chloro-8-methyl-10-(3'-dimethylaminopropyl)-10-thiaxanthenecarboxylate.

The above prepared carboxylate (20.1 g.) in 100 ml. of dry ether is added slowly to 2.0 g. of lithium aluminum hydride in 300 ml. of ether. The mixture is refluxed for six hours and treated as in Example 14 to give 2-chloro-8-methyl-10-(3'-dimethylaminopropyl)-10-thiaxanthene methanol.

A mixture of 20.0 g. of the above prepared methanol derivative, 100 g. of phosphorus pentoxide and 600 ml. of dry xylene is refluxed with stirring for three hours. After cooling, diluting with water and 40% sodium hydroxide until the solution is basic, separating the xylene layer, drying, evaporating the xylene and distilling the residue gives a mixture of 2-chloro-8-methyl-10-(3'-dimethylaminopropyl)dibenzo[b,f]thiepin and 2-chloro-8-methyl-11-(3'-dimethylaminopropyl)dibenzo[b,f]thiepin.

These isomers are separated by converting the free bases to the citrate salts and fractionally crystallizing these salts as in Example 16.

*Example 18*

2,7-dichloro-9-xanthenone is reduced with isoamyl alcohol and sodium, carboxylated by treating with butyl lithium in ether solution and with ether saturated with carbon dioxide, and esterified as described in Example 15 to give ethyl 2,7-dichloro-9-xanthenecarboxylate.

Potassium (3.9 g.) is added to 32.2 g. of ethyl 2,7-dichloro-9-xanthenecarboxylate in 350 ml. of dry toluene. The mixture is stirred at room temperature for two hours, then heated to reflux. After cooling, 20.0 g. of 3-chloro-1-dimethylaminopropane is added and the mixture is heated at reflux for 24 hours. Adding 100 ml. of ethanol, separating the toluene layer, extracting it with dilute hydrochloric acid, neutralizing the acid extracts, extracting with chloroform, evaporating and distilling the chloroform extracts gives ethyl 2,7-dichloro-9-(3'-dimethylaminopropyl)-9-xanthenecarboxylate.

An ether solution of the above prepared carboxylate (20.0 g. in 50 ml. of ether) is added to 2.0 g. of lithium aluminum hydride in 150 ml. of dry ether. Refluxing the mixture for 6.5 hours and working up as in Example 14 yields 2,7-dichloro-9-(3'-dimethylaminopropyl)-9-xanthene methanol.

A mixture of 15.0 g. of 2,7-dichloro-9-(3'-dimethylaminopropyl)-9-xanthene methanol, 75 g. of phosphorus pentoxide and 300 ml. of dry xylene is refluxed with stirring for three hours. Treating the reaction mixture as in Example 17 gives 2,8-dichloro-10-(3'-dimethyl aminopropyl)dibenz[b,f]oxepin.

A solution of 1.0 g. of the free base in 50 ml. of ethyl acetate is treated with an equivalent amount of alcoholic maleic acid to give, upon concentration and cooling, the maleate salt.

*Example 19*

A solution of 54.0 g. of ethyl 10-thiaxanthenecarboxylate in one liter of xylene is treated with 4.6 g. of sodium. The mixture is stirred for two hours at room temperature, then refluxed for five minutes. A solution of 50.0 g. of 1-methyl-3-bromomethylpiperidine in 200 ml. of xylene is added and the mixture is refluxed for 24 hours. Working up as in Example 18 gives ethyl 10-(1'-methyl-3'-piperidylmethyl)-10-thiaxanthenecarboxylate.

An ether solution of the above prepared carboxylate (42.0 g.) is added slowly to 4.0 g. of lithium aluminum hydride in 300 ml. of dry ether. Refluxing for 6.5 hours and working up as in Example 14 gives 10-(1'-methyl-3'-piperidylmethyl)-10-thiaxanthene methanol.

Refluxing 30.0 g. of the above prepared methanol compound in one liter of dry xylene containing 150 g. of phosphorus pentoxide for three hours and working up as in Example 17 gives 10-(1'-methyl-3'-piperidylmethyl)-dibenzo[b,f]thiepin.

*Example 20*

1-bromo-9-xanthenone is reduced by refluxing in isobutanol containing sodium, carboxylated by treating with butyl lithium in ether solution and with a carbon dioxide saturated ether solution and esterified to give ethyl 1-bromo-9-xanthenecarboxylate.

To a solution of 33.4 g. of ethyl 1-bromo-9-xanthenecarboxylate in 350 ml. of toluene is added 3.9 g. of potassium and the mixture is stirred for two hours, then heated to reflux. To the cooled mixture 40.0 g. of 3-bromo-1-piperidylpropane is added. Refluxing for 24 hours, treating with 100 ml. of ethanol, extracting the toluene solution with dilute hydrochloric acid, neutralizing the acid extracts with aqueous sodium carbonate, extracting with chloroform, evaporating and distilling the extracts gives ethyl 1 - bromo - 9 - (3' - N - piperidylpropyl) - 9 - xanthenecarboxylate.

A solution of 23.0 g. of the above prepared carboxylate in 100 ml. of ether is added to 1.9 g. of lithium aluminum hydride in 200 ml. of ether. The mixture is refluxed for 6.5 hours, then treated with ethyl acetate-ether and with water and worked up as in Example 14 to give 1-bromo-9-(3'-N-piperidylpropyl)-9-xanthene methanol.

A mixture of 15.0 g. of 1-bromo-9-(3'-N-piperidylpropyl)-9-xanthene methanol, 75 g. of phosphorus pentoxide and 600 ml. of dry xylene is stirred and refluxed for three hours. After cooling, water is added and the aqueous solution is made basic by adding 40% sodium hydroxide solution. Separating the xylene layer, drying, evaporating and distilling gives a mixture of 1-bromo-10-(3'-N-piperidylpropyl)dibenz[b,f]oxepin and 1-bromo-11-(3'-N-piperidylpropyl)dibenz[b,f]oxepin.

The isomers are separated by fractional crystallization of their citrate salts from ethanol-ether.

*Example 21*

Heating a mixture of o-chlorobenzoic acid, sodium p-methylthiophenolate and copper powder for one hour at 150°, extracting with ether, washing with dilute sodium hydroxide, saponifying the ester with potassium hydroxide and cyclizing by heating for five minutes with concentrated hydrochloric acid, making the solution alkaline with ammonium hydroxide and filtering the product gives 2-methylthio-9-xanthenone. Reduction by refluxing in isoamyl alcohol containing sodium, carboxylation by treatment with butyl lithium and carbon dioxide in ether solution and esterification gives ethyl 2-methylthio-9-xanthenecarboxylate.

The above prepared carboxylate is treated with potassium and with 3-chloro-1-dimethylaminopropane in toluene solution. Working up as in Example 20 gives ethyl 2 - methylthio - 9 - (3' - dimethylaminopropyl) - 9-xanthenecarboxylate. This carboxylate (20.0 g.) in 100 ml. of ether is added to 1.9 g. of lithium aluminum hydride in 200 ml. of ether. Refluxing for seven hours, treating with ethyl acetate-ether, heating to reflux, adding water, filtering and concentrating gives 2-methylthio-9-(3'-dimethylaminopropyl)-9-xanthene methanol.

A mixture of 10 g. of the above prepared methanol derivative, 50 g. of phosphorus pentoxide and 400 ml. of dry xylene is stirred and refluxed for four hours. Working up as in Example 20 gives a mixture of 2-methylthio-10 - (3' - dimethylaminopropyl)dibenz[b,f]oxepin and 2-methylthio - 11 - (3' - dimethylaminopropyl)dibenz[b,f]oxepin.

The isomers are separated by fractional crystallization of their hydrochloride salts from ethanol-ether.

What is claimed is:

1. A chemical compound of the class consisting of a free base and its nontoxic, pharmaceutically acceptable, acid addition salts, the free base having the structural formula:

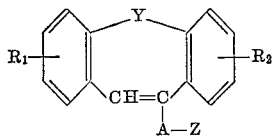

in which Y is a member selected from the group consisting of sulfur and oxygen; in which $R_1$ and $R_2$ are members selected from the group consisting of hydrogen, halogen having an atomic weight of less than 80, trifluoromethyl, lower alkyl, lower alkoxy and lower alkylthio; A is an alkylene chain having 2 to 4 carbon atoms, and Z is a member selected from the group consisting of di-lower alkylamino, N-pyrrolidinyl, C-(N-lower alkyl) piperidinyl, N-piperidinyl, N-piperazinyl, N'-formyl-N-piperazinyl, N'-methyl-N-piperazinyl, N'-hydroxyethyl-N-piperazinyl, N'-acetoxyethyl-N-piperazinyl and N'-hydroxyethoxyethyl-N-piperazinyl.

2. 10 - (3' - dimethylaminopropyl)dibenzo[b,f]thiepin.
3. 10 - (2' - dimethylaminoethyl)dibenzo[b,f]thiepin.
4. 2 - trifluoromethyl - 10 - (3' - dimethylaminopropyl)dibenz[b,f]oxepin.
5. 2 - trifluoromethyl - 11 - (3' - dimethylaminopropyl)dibenz[b,f]oxepin.
6. 10 - [3 - (4" - methyl - 1" - piperazinyl)propyl]-dibenzo[b,f]thiepin.

7. A chemical compound of the class consisting of a free base and its nontoxic, pharmaceutically acceptable, acid addition salts, the free base having the structural formula:

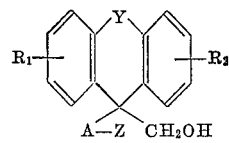

in which Y is a member selected from the group consisting of sulfur and oxygen; $R_1$ and $R_2$ are members selected from the group consisting of hydrogen, halogen having an atomic weight of less than 80, trifluoromethyl, lower alkyl, lower alkoxy and lower alkylthio; A is an alkylene chain having 2 to 4 carbon atoms, separating the nitrogen atoms to which it is attached by at least 2 carbon atoms; and Z is a member selected from the group consisting of di-lower alkylamino, N-pyrrolidinyl, N-piperidinyl, C-(N-lower alkyl)piperidinyl, N-piperazinyl, N'-formyl-N-piperazinyl, N'-methyl-N-piperazinyl, N'-hydroxyethyl-N-piperazinyl, N'-acetoxyethyl-N-piperazinyl and N'-hydroxy-ethoxyethyl-N-piperazinyl.

8. 10 - (3' - dimethylaminopropyl) - 10 - thiaxanthene methanol.
9. 10 - (2' - dimethylaminoethyl) - 10 - thiaxanthene methanol.
10. 2 - trifluoromethyl - 9 - (3' - dimethylaminopropyl)-9-xanthene methanol.
11. 10 - [3' - (4" - methyl - 1" - piperazinyl)propyl]-10-thiaxanthene methanol.

References Cited in the file of this patent

UNITED STATES PATENTS

| 2,676,971 | Cusic et al. | Apr. 27, 1954 |
| 2,951,082 | Sprague et al. | Aug. 30, 1960 |

FOREIGN PATENTS

| 202,143 | Austria | Feb. 10, 1959 |